May 19, 1942.  W. R. HUME  2,283,735

CENTRIFUGAL CONCRETE PIPE MOLDING MACHINE

Filed April 25, 1941   2 Sheets-Sheet 1

INVENTOR
WALTER REGINALD HUME
BY
Young, Emery & Thompson
ATTYS.

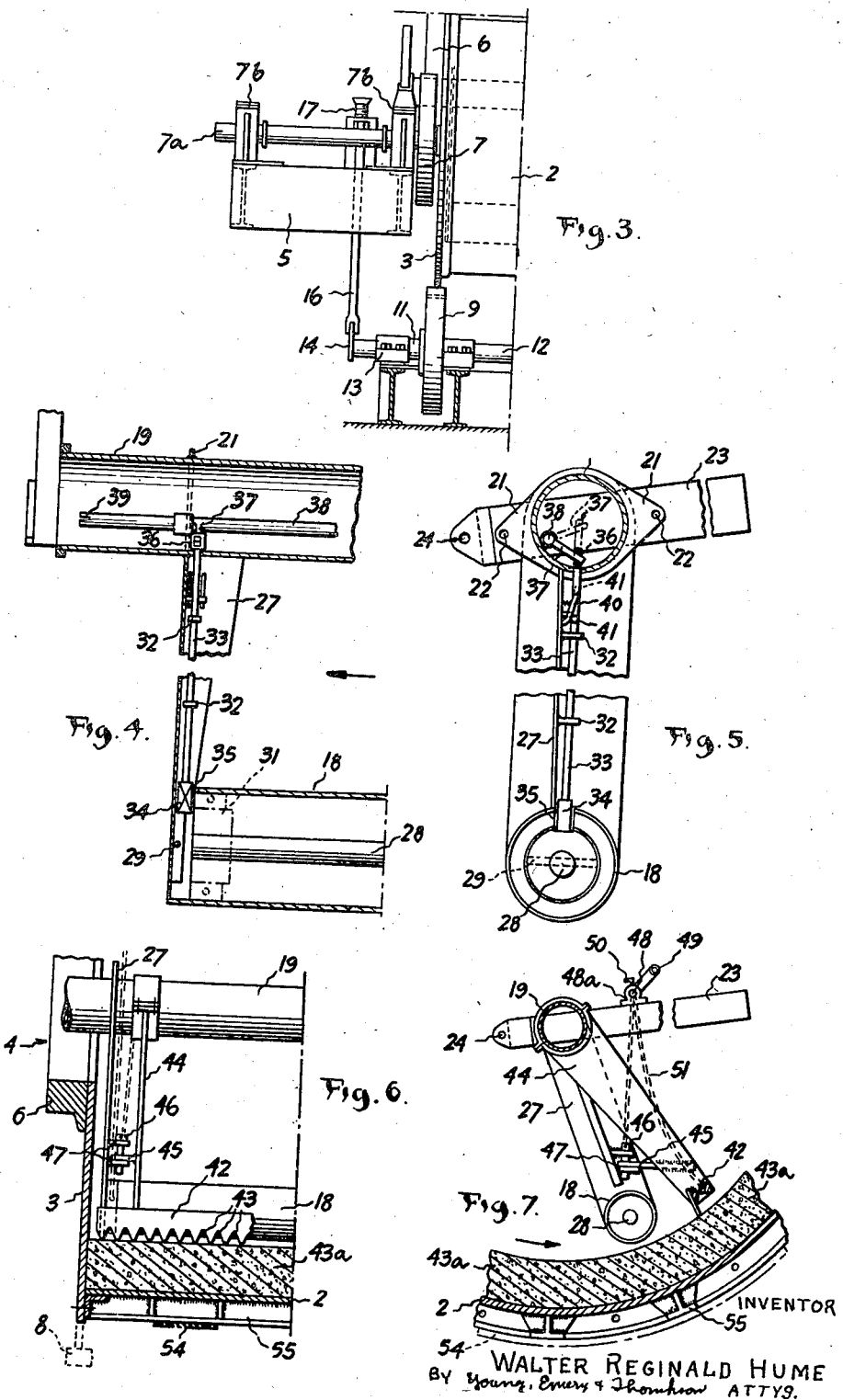

Patented May 19, 1942

2,283,735

UNITED STATES PATENT OFFICE 2,283,735

CENTRIFUGAL CONCRETE PIPE MOLDING MACHINE

Walter Reginald Hume, Melbourne, Victoria, Australia, assignor to Hume Pipe Company (Australia) Limited, Melbourne, Victoria, Australia Application April 25, 1941, Serial No. 390,392
In Australia December 6, 1939

24 Claims. (Cl. 25—30)

This invention relates to the manufacture of concrete pipes and like hollow bodies by the centrifugal process.

The present invention is particularly concerned with the manufacture of concrete pipes and the like of relatively large diameters such, for instance, as from five or six feet up to twelve or fourteen feet or even twenty feet in diameter. In the manufacture of such bodies considerable difficulties arise owing to the large size and heavy weight of the pipe and the mold in which centrifugalization takes place, and to the much higher peripheral speed necessary for molds of large diameter.

The invention is also applicable with suitable modification to the lining of relatively large diameter metal pipes with concrete or like cementitious material.

Hitherto it has been the usual practice in the centrifugal molding of such relatively large hollow bodies to support the mold upon frictional supporting and driving rollers or runner wheels a pair of which is disposed beneath each end of the mold periphery.

Each pair of said supporting rollers or runner wheels upon which the mold ends rest and rotate are spaced at a suitable distance apart and as the diameter of the pipe and the mold increases so the height of its centre of gravity and axis of rotation increases in relation to the spacing of the runner wheels so that with the high peripheral speeds of rotation there is a tendency for the large and heavy pipe and mold to become unstable or top heavy with consequent liability of the mold accidentally leaving its supporting rollers.

Furthermore owing to the relatively large size and heavy weight of the pipe and mold in relation to the diameter of the supporting rollers through the medium of which the driving motion is usually transmitted to the mold, the power necessary to rotate the heavy mold and the pipe therein and the peripheral speed of the supporting rollers greatly increase. The difficulty also arises in thus rotating the mold at a suitable speed without risk of it becoming displaced from the supporting and driving rollers as aforesaid.

The primary object of the present invention is to overcome the foregoing disadvantages and to support and drive the relatively large and heavy mold in such a manner as to obviate instability thereof and the liability of the mold leaving its supporting rollers as aforesaid.

With the above object in view, the invention provides improved means whereby, instead of the supporting rollers or runner wheels being arranged in the usual manner beneath the mold so as to engage the usual tread rings which surround the outer periphery thereof, the mold is suspended upon its supporting rollers which are elevated in relation to the periphery of the mold, or in other words, are located at a position between the outer circumference and the centre of the mold so that the centre of gravity of the latter is substantially lowered in relation to the contacting surfaces of the supporting rollers upon which the mold is suspended.

In accordance with the invention the foregoing object may be achieved in a simple and effective manner by providing the mold with detachable end plates in which are formed central openings of considerably smaller diameter than that of the mold casing and by fitting around these openings outstanding tread rings or flanges which are also of substantially smaller diameter than that of the mold casing. These tread rings or flanges which project from the mold end plates around the central openings therein rest upon the supporting rollers or runner wheels so that the lower part of the mold extends downwardly for a considerable distance between the pairs of supporting rollers at each end thereof and below the upper or contacting surfaces of the rollers upon which said flanges rest.

The invention also contemplates the driving of the mold by one or more belts or bands extending around the periphery of the mold or suitable tracks or the like thereon, instead of by the usual method of driving the mold through the medium of its supporting rollers.

As hereinafter described, a further feature of the invention resides in the improved means of mounting and operating a screeding or compacting roller which is suspended from a supporting bar or member extending through the aforesaid central openings in the mold end plates, means being associated with said supporting member whereby pressure may be exerted on the roller to force it against the inner surface of the annular concrete body after the latter has been initially spread or distributed and screeded within the mold. This initial screeding operation may be effected by means of a screed bar which is preferably serrated and screeds the concrete prior to its engagement by the roller.

The abovementioned screeding devices are preferably used with a concrete mix having a relatively low water content so that it is in a semi-dry or non-liquid state and will not flow along the mold as is the case with ordinary wet-mix concrete.

Referring to the drawings which form part of this specification:

Figure 3 is a fragmentary front view of portion of the apparatus seen in Figures 1 and 2.

Figure 4 is a fragmentary part sectional elevation showing the mounting of the screeding or compacting roller upon the arms carried by its supporting shaft or bar and the means for locking the roller against rotation.

Figure 5 is a view looking in the direction of the arrow in Figure 4.

Figure 6 is a fragmentary part sectional elevation taken transversely through the mold and illustrating the use of a serrated screeding bar in conjunction with the screeding or compacting roller.

Figure 7 is a side view of the arrangement seen in Figure 6, portions being omitted for convenience of illustration. The arrow indicates the direction of rotation of the mold.

According to a suitable practical embodiment of the invention the mold casing 2 is detachably mounted between two special mold end plates 3. These end plates may, if desired, be provided with a series of circular rows or sets of bolt holes (not shown) located at different distances from the centre of the end plates whereby mold casings of varying diameters may be attached to and secured between the said end plates. By this means the same end plates may be applied to a number of mold casings of different diameters.

Formed through each of said end plates is a central opening 4 which is sufficiently large to permit of the introduction of the cementitious material but is of smaller diameter than the mold casings 2.

Figure 1:
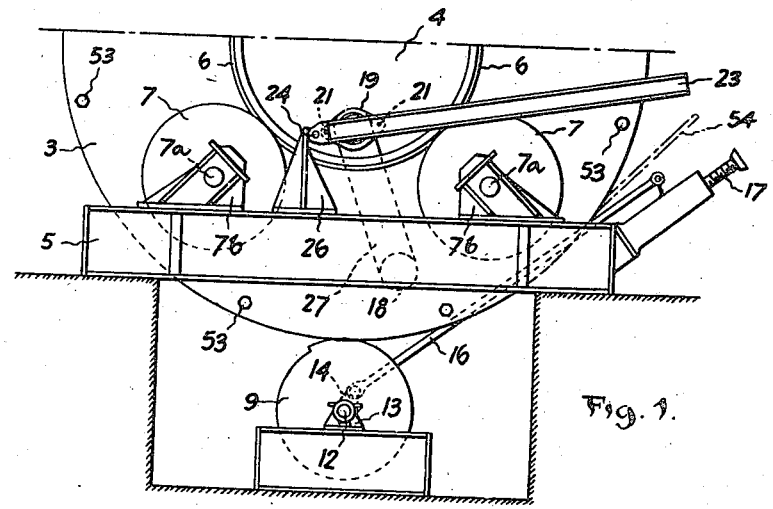
Figure 1 is an end elevation of apparatus in accordance with the invention, only the lower half of the mold being shown.

Secured to each said end plate around the central opening 4 therein is an outstanding annular flange 6 which constitutes a tread ring or tyre and is adapted to rest and rotate upon a pair of the mold supporting rollers or runner wheels 7. The shafts 7a of the rollers may be mounted in bearings 7b on a fixed main frame 5 of the machine through which the mold may extend downwardly beneath the supporting rollers as seen in Figure 1.

Owing to the relatively small diameter of the outstanding flanges as compared with the mold casing 2, the lower part of the mold extends downwardly for a considerable distance between the pairs of runner wheels at each end thereof and beneath the contacting surfaces of said rollers upon which the mold is suspended. The centre of gravity of the mold and the material therein is thus located at a much lower point in relation to the said contacting surfaces of the supporting rollers 7 than is the case where the latter are arranged beneath the bottom or lower arc of the mold casing in accordance with the usual practice. The result is that stability of the mold upon the runner wheels is ensured so that the mold may be safely driven at suitable speeds during the centrifugal process without risk of its accidental displacement from the supporting rollers.

As indicated in dotted lines in Figure 6, the mold end plates 3 may, if desired, be of larger diameter than and project beyond the mold casing, and the outer edges of the end plates may be fitted with relatively heavy rims 8 which serve to strengthen the end plates and increase the weight of the outer periphery thereof so as to impart a fly-wheel effect to the mold and further ensure its stability on the supporting rollers. The rims 8 on the end plates may also be adapted to contact with suitable means such, for instance, as a mechanically or hydraulically operated roller or rollers whereby the flanges 6 may be intermittently lifted slightly from and dropped onto the supporting rollers so as to impart a jolting or concussional action to the mold and the semi-dry concrete mixture therein. Preferably, however, this jolting or concussional action is imparted to the mold by means of stepped cams or jolting wheels 9 engaging the mold end plates 3. Alternatively, the end plates may be stepped and engage rollers to impart the said jolting action to the mold.

In order to raise and lower the cams or jolting wheels 9 into and out of engagement with the mold end plates 3 so that the jolting action may be commenced and discontinued as desired, the cams 9 may be mounted upon eccentric portions 11 on a shaft 12 which is mounted in bearings 13 beneath the mold. An arm 14 on one end of the shaft 12 may be connected by a link 16 to a screw or like adjusting device 17, whereby the shaft 12 may be turned to move the cams 9 into and out of engagement with the mold end plates 3.

In order to distribute and screed the cementitious material which is preferably in a semi-dry or non-liquid state as aforesaid, and to exert additional pressure upon the inner surface of the annular concrete body in the mold. I preferably provide, in accordance with the present invention, a screeding or compacting roller 18 which is carried by or suspended from a horizontal supporting bar or shaft 19 extending through the central openings 4 in the mold ends. The ends of this supporting bar or shaft are secured to brackets or the like 21 which may be detachably secured by means of bolts 22 to levers 23 which are pivoted, as at 24 to brackets 26 upon the fixed main frame 5 outside and adjacent to each end of the mold.

The supporting bar or shaft 19 extends parallel to the mold axis but is disposed eccentrically in relation thereto and near the bottom of the central openings 4 in the mold end plates.

Projecting from the bar or shaft 19 within the mold and towards the periphery of the mold casing is a pair of arms 27 to the outer end portions of which the shaft or axle 28 of the screeding roller 18 is secured as by means of pins 29, seen in Figures 4 and 5. The roller 18 is freely mounted on ball or like bearings on shaft 28 as indicated at 21 in Figure 4.

Mounted in guides 32 on the arms 27 so as to be capable of sliding longitudinally in relation thereto, are locking spindles 33 which are provided at their outer ends with locking members or keys 34. These locking members are adapted to enter slots or recesses 35 in the ends of the roller 18, whereby the latter may be locked against rotation when desired. The upper or inner ends of the locking spindles 33 are provided with apertures 36 accommodating the outer ends of arms 37 the opposite ends of which are attached to a rocking shaft 38 accommodated within the supporting bar 19 which is preferably hollow as shown. One end of the rocking shaft 38 may be provided with a slot 39 to receive a pin on a crank handle or the like, whereby the shaft may be rocked to withdraw the locking members 34 from the slots or recesses 35 in the roller 18.

In order to positively retain the locking members in their raised or withdrawn position, spring catches 40 may be pivotally mounted upon the arms 27. These catches are adapted to be engaged by pins or projections 41 upon the locking spindles 33 so that the pins 41 may move past the catches 40 when the spindles 33 are being raised to withdraw the locking members 34 from the recesses 35 in the screeding roller. The pins 41 thus engage the upper ends of the catches 40 as indicated by the position of the pin in dotted lines in Figure 5, and the locking members 34 are thereby positively retained in their withdrawn position until it is again desired to lock the roller 18 against rotation. This may be effected by releasing the catches 40 from the pins or projections 41 so that the locking members may again be engaged with the recesses 35 in the roller. By the above means any liability of breakage or damage to the parts is ensured.

In conjunction with the roller 18 there may also be provided a screeding bar 42 of substantially flat cross section and preferably having a serrated edge 43. This screeding bar which is set at an angle to the inner surface of the concrete 43a as indicated in Figure 7 and is adapted to initially screed and distribute the concrete prior to the use of the roller 18, may be mounted upon the outer or lower ends of a second pair of arms 44, the opposite ends of which are pivotally mounted to turn upon the supporting bar or shaft 19.

Projecting in a substantially horizontal direction from the lower portion of each of the arms 44 is a member 45 which is provided with a hole to receive a removable vertical locking pin 46 which also passes through coinciding holes in brackets or extensions 47 on the adjoining arms 27 supporting the shaft or axle 28 of the roller 18.

The upper end of the locking pin 46 is attached to the lower end of a flexible connection such as a rope or chain the upper end of which is attached to a horizontal winding spindle 48 mounted in bearings 48a on the levers 23. This spindle may be turned by means of a handle 49 in order to withdraw the locking pin 46 from the holes in the member 45 and the brackets or extensions 47 and thus disconnect the arms 27 and 44. By means of a locking screw 50 or the like, the operating handle 49 may then be clamped or secured in the desired position until it is again desired to insert the locking pin 46 in the holes in the members 45 and 47 and thus unite the arms 27 and 44 so that the roller 18 and the screeding bar 42 may be raised and lowered bodily with the levers 23. Similar flexible connections indicated at 51, may also be attached at opposite ends to the winding spindle 48 and to the screeding bar 42, the length of these latter connections being so adjusted that they do not become taut until the locking pin 46 has been withdrawn from the members 45 and 47 as aforesaid. Thus, by turning the operating handle 49 the locking pin 46 is first withdrawn from the position seen in Figures 6 and 7 so as to disconnect the arms carrying the roller 18 from the arms carrying the screeding bar 42. Then by further operating the handle 49 the slackness in the connection 51 is taken up and as these connections become taut the screeding bar 42 is raised clear of the concrete indicated at 43a.

By depressing the levers 23 about their pivots 24, the roller 18 may now be brought into contact with the surface of the concrete to complete the screeding or distributing operation. At this stage the roller 18 is first locked against rotation by means of the locking members 34 engaging the slots or recesses 35 in the roller so that the latter will resist and break up or spread any lumps or like portions on the inner surface of the concrete body, instead of riding over the same. By withdrawing the locking members 34 from the recesses in the roller as previously described, the roller is then permitted to rotate freely by frictional contact with the concrete so that the latter is subjected to the compressing or compacting action of the rotating roller.

The roller 18 and the screeding bar 42 may be of relatively heavy construction and downward pressure may be applied to the outer ends of levers 23 so as to exert a heavy pressure upon the concrete during the rotation of the centrifugal mold. As previously stated, the centrifugal molding operation may be employed in combination with the jolting or concussional movement of the mold to thereby effectively consolidate the relatively dry concrete mixture.

The pressure of the roller 18 may be removed from the concrete by raising the levers 23 during the combined centrifugal and jolting process or, if desired, the roller may be left resting upon the concrete during this operation.

If desired, the roller 18 and its appurtenances may be employed without the screeding bar 42 which is, however, preferably used to perform the initial screeding operation as above described.

When the molding operation has been completed the roller 18, the screeding bar 42 and other parts attached to the levers 23 may be removed through the central openings in the mold end plates by withdrawing the pivot pins 24 and the bolts or the like 22 by which the brackets 21 are attached to said levers. These parts may be similarly replaced within another mold when the next molding operation is to be commenced.

Figure 2:
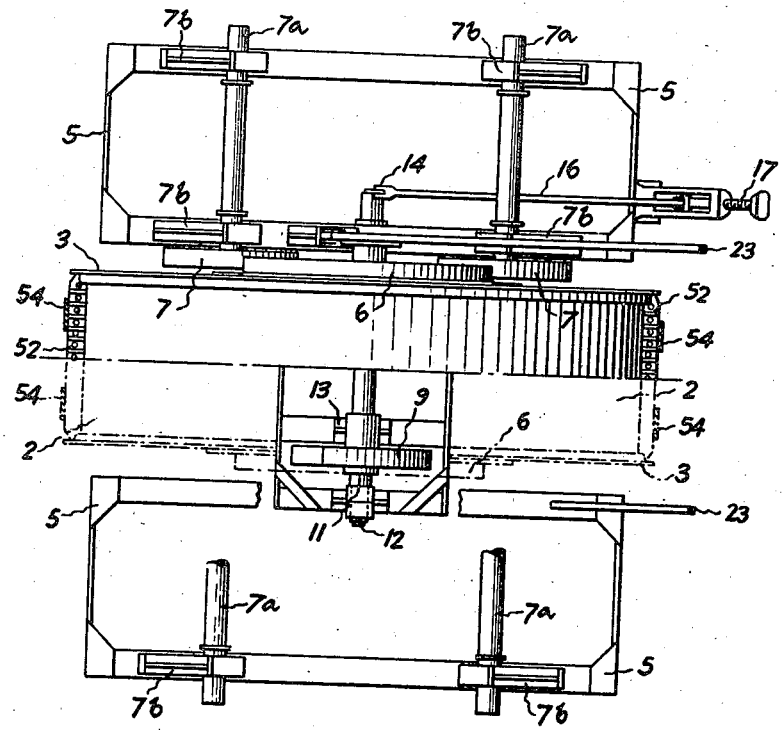
Figure 2 is a plan of the apparatus seen in Figure 1, portions being broken away and removed for convenience of illustration.

The mold casing 2 is preferably formed in two or more sections which may be detachably connected together by bolts or the like as indicated at 52 in Figure 2, these sections of the casing being removed from the molded concrete body when the latter has set sufficiently. The sections of the mold casing may be also suitably connected to the mold end plates 3 by bolts or the like as indicated at 53 in Figure 1 so that the same pair of end plates may be readily detached and interchanged with mold casings of different diameters.

Instead of driving the mold through the medium of the supporting rollers or runner wheels in accordance with usual practice the mold is preferably driven, in accordance with the present invention, through the medium of one or more driving bands such as ropes or belts indicated at 54 which pass around the outer periphery of the mold casing or ribs 55 forming tracks thereon and around a suitably arranged driving pulley or pulleys. The latter may be adjusted by means of screw or other suitable mechanism whereby the tension of the driving band or bands may be relieved and each driving band may be disengaged from the mold so that the latter may be readily removed from its supporting rollers and the band or bands may be again placed around and engaged with another mold when desired.

The relatively heavy mold may be placed upon and removed from the supporting rollers by means of a suitable hoisting gear.

Whilst the invention is more particularly intended for use in the centrifugal manufacture of concrete pipes and the like of relatively large diameter and short length, it may also be applied to the lining of metal and other pipes with cementitious material. In this case the end plates with the central openings surrounded by the outstanding tread rings or flanges, which rest upon the supporting rollers, may be detachably secured to the pipe to be lined.

Having now described my invention what I claim as new and desire to secure by Letters Patent is:

1. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates, and rollers positioned beneath and engaging the annular flanges of the end plates to support said mold.

2. A mold for the centrifugal manufacture of concrete pipes of large diameter positioned for rotation about a horizontal axis and comprising a tubular mold casing, a pair of annular mold end plates detachably mounted on the mold casing and provided with central openings therein to provide access to the interior of the mold casing, an annular flange of substantially smaller radius than the mean radius of said end plates extending laterally from the outer face of each end plate concentrically with and between the openings and the outer periphery of the end plates, and rollers positioned beneath and engaging the annular flanges of the end plates to support said mold.

3. A mold for the centrifugal manufacture of concrete pipes of large diameter positioned for rotation about a horizontal axis and comprising a tubular mold casing, a pair of annular mold end plates detachably mounted on the mold casing and provided with central openings therein to provide access to the interior of the mold casing, an annular flange of substantially smaller radius than the mean radius of said end plates extending laterally from the outer face of each end plate concentrically with and between the openings and the outer periphery of the end plates, rollers positioned beneath and engaging the annular flanges of the end plates to support said mold, screeding devices adapted to act upon the concrete within the lower part of the mold beneath said openings, and means for supporting and controlling the operation of such devices by way of said openings.

4. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates, rollers positioned beneath and engaging the annular flanges of the end plates to support said mold, and means for intermittently lifting the flanges slightly from and dropping them onto said supporting rollers during rotation of the mold to thereby impart a concussional and jolting motion to the mold and its contents.

5. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates, rollers positioned beneath and engaging the annular flanges of the end plates to support said mold, jolting cams arranged beneath said mold end plates, and means for raising and lowering said jolting cams into and out of engagement with said end plates.

6. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates, rollers positioned beneath and engaging the annular flanges of the end plates to support said mold, a supporting bar extending through the openings in the end plates, arms extending radially outwardly from said supporting bar or shaft within the mold and towards the periphery thereof, a screeding roller extending between and mounted upon the outer ends of said arms in parallel relation with said bar, and means for controlling the rotation of said roller.

7. Apparatus according to claim 3 wherein said screeding devices include a screeding bar which is adapted to initially screed and distribute the concrete in the lower part of the mold as the latter rotates and a compacting roller which is adapted to exert roller pressure upon such screeded material.

8. Apparatus according to claim 2, wherein the said mold supporting rollers are mounted in bearings upon a fixed frame through which the mold extends downwardly beneath said supporting rollers when said flanges are resting thereon.

9. Apparatus according to claim 1, wherein said mold end plates extend beyond the outer periphery of the mold casing and are provided at their outer edges with relatively heavy rims.

10. Apparatus according to claim 6, wherein said supporting bar for said roller is attached at its ends to pivoted levers located externally of the mold ends.

11. Improvements in or relating to the centrifugal molding of concrete pipes and the like consisting in the combination of a tubular mold mounted for rotation about a horizontal axis and having ends provided with central openings, levers pivotally mounted upon a frame externally of the mold ends, a supporting bar attached at its ends to said levers and passing through the central openings in the mold ends in a position parallel with its axis, arms extending outwardly from said bar towards the periphery of the mold and screeding means carried on the outer ends of said arms and adapted to be pressed against the concrete in the mold by operation of said levers.

12. Apparatus according to claim 11, in which the screeding means is a screeding or compacting roller mounted upon the outer ends of said arms, and means whereby said roller may be locked against rotation or allowed to rotate about its axis when in contact with the concrete in the mold.

13. Apparatus according to claim 11, in which the screeding means is a screeding or compacting roller mounted upon the outer ends of said arms, and means whereby said roller may be locked against rotation or allowed to rotate about its axis when in contact with the concrete in the mold, said means for locking said roller against rotation comprising locking members adapted to engage recesses in the roller and manually operated means for withdrawing said locking members from said recesses to permit the roller to rotate by its frictional contact with the concrete when desired.

14. Apparatus according to claim 11, wherein said screeding means is a roller mounted to rotate about a shaft which is fixed to the outer portions of said arms.

15. Apparatus according to claim 11, in which the screeding means is a screeding or compacting roller mounted upon the outer ends of said arms, means whereby said roller may be locked against rotation or allowed to rotate about its axis when in contact with the concrete in the mold, said means for locking said roller against rotation comprising locking members adapted to engage recesses in the roller, and manually operated means for withdrawing said locking members from said recesses to permit the roller to rotate by its frictional contact with the concrete when desired, guides on said arms, locking spindles slidably mounted in said guides, said locking members being carried by the ends of said spindles adjacent the ends of said arms, and a rocking shaft having levers at its ends for displacing said spindles to actuate the locking members.

16. Apparatus according to claim 11, in which the screeding means is a screeding or compacting roller mounted upon the outer ends of said arms, means whereby said roller may be locked against rotation or allowed to rotate about its axis when in contact with the concrete in the mold, said means for locking said roller against rotation comprising locking members adapted to engage recesses in the roller, and manually operated means for withdrawing said locking members from said recesses to permit the roller to rotate by its frictional contact with the concrete when desired, guides on said arms, locking spindles slidably mounted in said guides, said locking members being carried by the ends of said spindles adjacent the ends of said arms, and a rocking shaft having levers at its ends for displacing said spindles to actuate the locking members, said supporting bar being hollow and said rocking shaft being mounted in said hollow bar.

17. Apparatus according to claim 11, in which the screeding means is a screeding or compacting roller mounted upon the outer ends of said arms, means whereby said roller may be locked against rotation or allowed to rotate about its axis when in contact with the concrete in the mold, said means for locking said roller against rotation comprising locking members adapted to engage recesses in the roller, and manually operated means for withdrawing said locking members from said recesses to permit the roller to rotate by its frictional contact with the concrete when desired, spring catches associated with said locking means and adapted to positively retain said locking members out of engagement with the recesses in said roller.

18. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates, and rollers positioned beneath and engaging the annular flanges of the end plates to support said mold, screeding means comprising in combination a non-rotary screeding bar which is associated with an adjacent screeding roller and is adapted to initially screed the concrete within the mold before it is acted upon by said roller, and means for controlling the actuation of said bar and roller.

19. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates, and rollers positioned beneath and engaging the annular flanges of the end plates to support said mold, screeding means comprising in combination a non-rotary screeding bar which is associated with an adjacent screeding roller and is adapted to initially screed the concrete within the mold before it is acted upon by said roller, and means for controlling the actuation of said bar and roller, a supporting bar passing through the openings in the ends of the mold, levers pivotally mounted exteriorly of the mold and carrying said bar, a pair of arms pivotally mounted at one of their inner ends on the supporting bar, said screeding bar being of substantially flat cross section and carried by the outer ends of said pair of arms.

20. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates, and rollers positioned beneath and engaging the annular flanges of the end plates to support said mold, screeding means comprising in combination a non-rotary screeding bar which is associated with an adjacent screeding roller and is adapted to initially screed the concrete within the mold before it is acted upon by said roller, means for controlling the actuation of said bar and roller, a supporting bar passing through the openings in the ends of the mold, levers pivotally mounted exteriorly of the mold and carrying said bar, a pair of arms pivotally mounted at one of their inner ends on the supporting bar, said screeding bar being of substantially flat cross section and carried by the outer ends of said pair of arms, and means for swinging said pivoted arms carrying the screeding bar about the axis of said supporting bar to thereby disengage the outer working edge of the screeding bar from the concrete after the initial screeding operation and prior to the use of said roller.

21. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates and rollers, positioned beneath and engaging the annular flanges of the end plates to support said mold, screeding means comprising in combination a non-rotary screeding bar which is associated with an adjacent screeding roller and is adapted to initially screed the concrete within the mold before it is acted upon by said roller, means for controlling the actuation of said bar and roller, a supporting bar passing through the openings in the ends of the mold, levers pivotally mounted exteriorly of the mold and carrying said bar, a pair of arms pivotally mounted at one of their inner ends on the supporting bar, said screeding bar being of substantially flat cross section and carried by the outer ends of said pair of arms, a second pair of arms carried by said supporting bar adjacent the first-recited arms, a screeding roller carried by the outer ends of said second pair of arms, means for temporarily uniting the pivoted arms carrying said screeding bar and adjacent arms carrying said roller during the initial screeding operation, and means for disconnecting said arms to permit the screeding bar on said pivoted arms to be swung clear of the concrete in the mold when the initial screeding operation has been effected and before engaging said roller with the concrete.

22. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates, and rollers positioned beneath and engaging the annular flanges of the end plates to support said mold, screeding means comprising in combination a non-rotary screeding bar which is associated with an adjacent screeding roller and is adapted to initially screed the concrete within the mold before it is acted upon by said roller, means for controlling the actuation of said bar and roller, a supporting bar passing through the openings in the ends of the mold, levers pivotally mounted exteriorly of the mold and carrying said bar, a pair of arms pivotally mounted at one of their inner ends on the supporting bar, said screeding bar being of substantially flat cross section and carried by the outer ends of said pair of arms, a second pair of arms carried by said supporting bar adjacent the first-recited arms, a screeding roller carried by the outer ends of said second pair of arms, means for uniting the pivoted arms carrying the screeding bar and the adjacent arms carrying the roller including a removable locking pin, a flexible element connected to the screeding bar, a flexible element connected to said removable locking pin, a winding gear, said flexible elements being connected to said winding gear for winding thereon and of such a length that said locking pin may be withdrawn to disconnect said arms and by continued operation of the winding gear said screeding bar may be raised clear of the concrete within the mold before pressing said roller against the concrete.

23. A mold for the centrifugal manufacture of concrete pipes of large diameter positioned for rotation about a horizontal axis and comprising a tubular mold having annular end plates provided with central openings therein to provide access to the interior of the mold casing, an annular flange of substantially smaller radius than the mean radius of said end plates extending laterally from the outer face of each end plate concentrically with and between the openings and the outer periphery of the end plates and rollers positioned beneath and engaging the annular flanges of the end plates to support said mold, the mold end plates being detachably connected to the mold casing, and belt means passing around the outer periphery of said casing for rotating the mold.

24. Apparatus according to claim 18, wherein the outer edge of said screeding bar is of serrated formation.

WALTER REGINALD HUME.